April 9, 1963  F. CORDERO ETAL  3,084,549
AIRCRAFT CABIN PRESSURE ERROR INDICATOR
Filed Feb. 8, 1960

Inventors
FIDEL CORDERO
RICHARD W. ARMSTRONG
By R. J. Tompkins
Attorney 3,084,549
Patented Apr. 9, 1963

3,084,549
AIRCRAFT CABIN PRESSURE ERROR INDICATOR
Fidel Cordero, Washington, D.C., and Richard W. Armstrong, Rockville, Md., assignors to the United States of America as represented by the Secretary of the Navy
Filed Feb. 8, 1960, Ser. No. 7,495
7 Claims. (Cl. 73—407)
(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft cabin pressure error indicator and more particularly to an indicator which will indicate the deviation of pressure within an aicraft cabin from a predetermined schedule of pressures to be maintained within the cabin versus pressure outside the cabin.

It is well known that because of the multiplicity of instruments required for modern aircraft there has been much effort directed toward combining aircraft instruments or improving the manner of their presentation so that the pilot's task of interpretation would be simplified. The present invention is directed toward simplifying the pilot's task in determining whether the proper pressure is being maintained within an aircraft cabin. The cabins of high altitude aircraft are pressurized beginning at a predetermined altitude up to the ceiling of the aircraft. Depending upon the structural strength of the aircraft cabin and the mission that the aircraft is to perform, a predetermined schedule of cabin pressures versus pressure outside the cabin can be determined. FIG. 2 illustrates an example of a predetermined schedule of cabin pressures for an aircraft which commences cabin pressure at 8000 feet altitude, which has a structural limiting differential pressure of 5 pounds per square inch and which has a ceiling of 80,000 feet. Heretofore, in order to maintain such a cabin pressure schedule the pilot was required to read the altitude indicator and the cabin pressure indicator and then relate this data to a curve or table. Attention of the pilot for performing these indicator readings and for applying the data to a curve or table is practically impossible when arduous maneuvers are being performed and when the pilot is flying under emergency situations. The present invention has solved this problem by providing a single instrument which will inform the pilot by the position of a pointer in relationship to a mark whether the cabin pressure is above, below or exactly on schedule.

An object of the present invention is to provide an indicator for indicating the deviation in pressure within an enclosure from a predetermined schedule of pressures to be maintained within said enclosure.

Another object is to provide an aircraft cabin pressure indicator for indicating the deviation of aircraft cabin pressure from a predetermined schedule of pressures to be maintained within the cabin versus pressure outside the cabin.

Other objects and many of the attendant advantages of this invention will be readily appreciated as the same becomes better understood by reference to the following detailed description when considered in connection with the accompanying drawings wherein.

Figure 2:
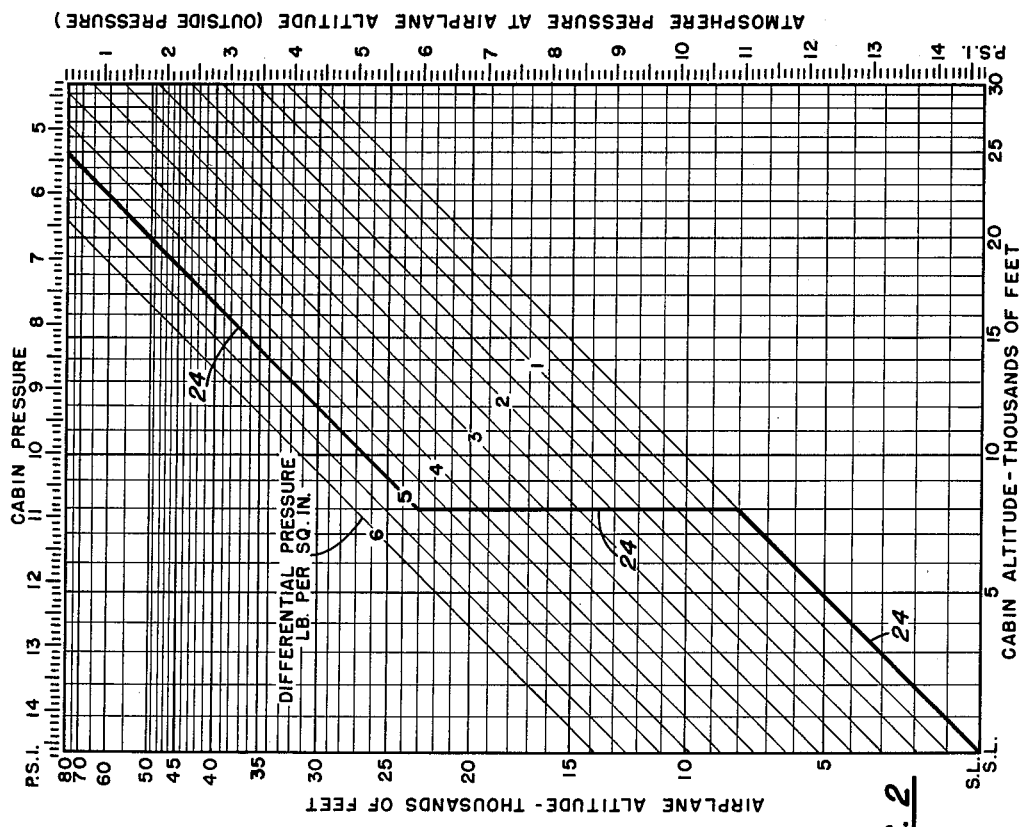
FIG. 2 is an example of a predetermined schedule of pressures to be maintained within an aircraft cabin, the slant lines representing the differential in pressure between pressure in the cabin and pressure outside the cabin in pounds per square inch.
Figure 1:
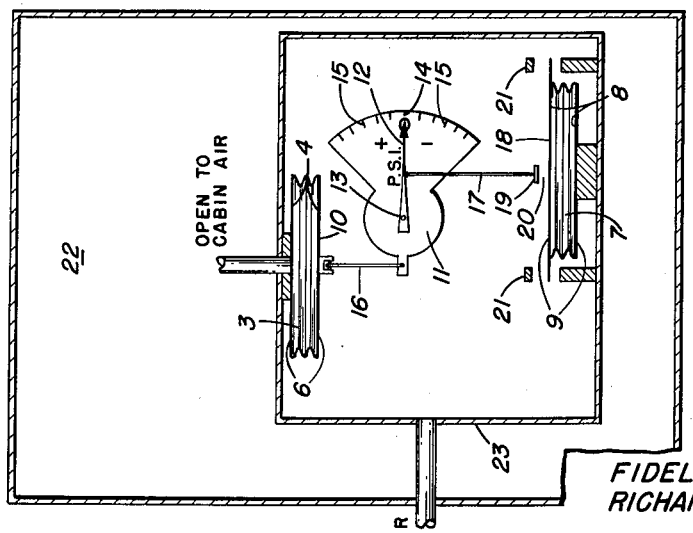
FIG. 1 shows a diagrammatic view of an illustrated embodiment of the invention.

Referring now to the drawings the darkest line 24 shown in FIG. 2 represents a schedule of pressures to be maintained within an aircraft cabin. This particular schedule is for a cabin that is to be pressurized at 8000 feet altitude, which has a structural limiting pressure differential between the pressure inside the cabin and outside the cabin of 5 pounds per square inch and which has an altitude ceiling of 80,000 feet. Under such conditions it will be noted that from sea level to 8000 feet the pressure outside the cabin and pressure inside the cabin are the same, that from 8000 feet to 23,000 feet a constant absolute pressure is maintained within the cabin and that from 23,000 feet up to 80,000 feet the absolute pressure of the cabin is decreased in order to maintain a 5 pounds differential between cabin pressure and outside pressure. The device illustrated in FIG. 1 is adapted to operate according to the schedule of pressures set forth in FIG. 2. In this device a diaphragm capsule 3 is fixed in relationship to an aircraft cabin 22 within indicator case 23 said capsule having an interior side 4 exposed to the pressure within the cabin and an exterior side 6 exposed to the atmospheric pressure outside the cabin. A second diaphragm capsule 7, fixed in relationship to the cabin, is completely sealed and has an interior side 8 exposed to a constant pressure and has an exterior side 9 exposed to the atmospheric pressure outside the cabin. A dial 11 and a pointer 12 are rotatably mounted on a common point 13. Dial 11 has a zero mark 14 and marks 15 on each side of this zero mark representing pounds per square inch plus or minus deviation from the schedule shown in FIG. 2. This means that when pointer 12 overlies zero mark 14 the pressure in the cabin is on schedule and when the pointer 12 is to one side or the other of zero mark 14 the deviation from the schedule in pounds per square inch and whether it is a plus or minus is indicated. A rod 16 is pivotally connected at one end to the movable portion 10 of capsule 3 and at the other end is pivotally connected to the dial. A rod 17 is pivotally connected at one end to pointer 12 and at the other end 19 is positioned a predetermined distance from the movable portion 18 of capsule 7. The distance from the connection of rod 16 and dial 11 to common point 13 is to be equal to the distance from the connection of rod 17 and pointer 12 to said common point 13 so that equal movements of rod 16 and rod 17 will cause dial 11 and pointer 12 respectively to be rotated an equal angle around point 13. The distance between end 19 of rod 17 and portion 18 of capsule 3 is an inactive range 20 so that portion 18 will move a specified distance before it operates on rod 17. When pointer 12 is directly over zero mark 14 the distance between end 19 and portion 18 is to be equal to the distance that portion 18 will move when the altitude of the aircraft cabin ascends from sea level to 8000 feet. Stops 21 are fixedly positioned a predetermined distance from portion 18 when pointer 12 overlies zero mark 14, this distance to be equal to the distance that portion 18 travels when the aircraft cabin ascends from sea level up to 23,000 feet.

In the operation of the illustrated embodiment of the invention it will be noted that from sea level to 8000 feet neither dial 11 nor pointer 12 will rotate around point 13 and during this ascension the pilot will not be concerned about pressurizing the cabin. Commencing at the 8000 feet level the cabin is to be pressurized and it is at this level portion 18 of capsule 7 begins to actuate rod 17 thus rotating pointer 12. Unless the cabin is pressurized at the 8000 feet level the pointer 12 will rotate to dial 11 indicating that the cabin should be pressurized. If the cabin is pressurized at the 8000 feet level so that its absolute pressure is maintained from 8000 feet to 23,000 feet dial 11 will rotate through the same arc and in the same direction as pointer 12 so that pointer 12 will be maintained over zero mark 14. At 23,000 feet the structural limit of the cabin is reached and in order not to exceed this structural limit any ascension of the cabin above that altitude will require a bleeding of the pressure in the cabin, thereby reducing the cabin's absolute pressure. In the example given the structural limit of the cabin was a pressure differential of 5 pounds per square inch between inside cabin pressure and outside cabin pressure so at 23,000 feet, which is the altitude where this differential is reached, stops 21 stop the movement of portion 18. Thus at the 23,000 level pointer 12 ceases to rotate around point 13 and unless the cabin pressure is released at the same rate as the decrease in pressure due to ascension of the cabin, dial 11 will rotate relative to pointer 12 indicating that the schedule of cabin pressures is not being maintained. If the cabin pressure is bled properly above 23,000 feet so that a 5 pounds per square inch differential is maintained between inside cabin pressure and outside cabin pressure dial 11 will not rotate. With no rotation of dial 11 and since pointer 12 is restrained from rotation above 23,000 feet pointer 12 will lie directly over zero mark 14 indicating that the cabin pressure is on schedule.

Obviously many modifications and variations of the present invention are possible in the light of the above teachings. It is therefore to be understood, that within the scope of the appended claims, the invention may be practiced otherwise than as specifically described.

What is claimed is:

1. An indicator for indicating the deviation in pressure within an enclosure from a predetermined schedule of pressures to be maintained within said enclosure and having means for preventing further movement of the indicator when the structural pressure differential limit of said enclosure is attained, said indicator comprising an indicator housing within said enclosure, a first diaphragm capsule mounted in said housing responsive to the pressure differential between a scheduled pressure in said enclosure and a variable pressure outside of said enclosure, a second diaphragm capsule mounted in said housing responsive to said variable pressure outside of said enclosure, first and second rotatable members in rotatable relationship to each other for indicating the degree of deviation of the pressure within said enclosure from said scheduled pressure, said first diaphragm capsule connected to said first rotatable member, said second rotatable member positioned in relationship to a movable portion of said second diaphragm capsule for rotation of said second rotatable member and stopping means mounted within said housing in proximity of said second diaphragm capsule for inactivating rotation of said second rotatable member when the variable pressure within said enclosure reaches a value which is indicative of a predetermined structural pressure differential limit of said enclosure.

2. An indicator as claimed in claim 1 wherein said second diaphragm capsule imparts rotation to said second rotatable member through a rod, said rod being affixed to said second member and being engaged to said second diaphragm only below a predetermined pressure.

3. An aircraft cabin pressure indicator for indicating the deviation of the cabin pressure from a predetermined schedule of pressures to be maintained within the cabin versus the pressure outside the aircraft and having means for preventing further movement of the indicator when the structural pressure differential limit of the aircraft cabin is attained, said indicator comprising an indicator housing, a first diaphragm capsule mounted within said housing and responsive to the pressure differential between the pressure in said cabin and the pressure outside said cabin, a second diaphragm capsule mounted within said housing and responsive to pressure changes outside said cabin, a first rotatable member connected to said first diaphragm capsule, a second rotatable member rotatably responsive to said second diaphragm capsule, inactivating means positioned in said housing in proximity of said second capsule for inactivating the response of said second rotatable member to vary the relative rotation of said first and second members, said first and second members being positioned in relation to each other in such a manner that the degree of relative rotation therebetween will indicate the degree of deviation of said cabin pressure.

4. An aircraft cabin pressure indicator as claimed in claim 3 wherein the inactivating means for inactivating the response of said second rotatable member to vary the relative rotation of said first and second members comprises an inactive range between said second diaphragm capsule and said second rotatable member so that during a predetermined range of outside pressures the second member will not rotate even though the second diaphragm moves during pressure changes within said predetermined range of pressures.

5. An aircraft cabin pressure indicator as claimed in claim 3 wherein the inactivating means for inactivating the response of said second rotatable member to vary the relative rotation of said first and second members comprises at least one stop rigidly fixed in relationship to the aircraft and positioned with respect to said second diaphragm capsule so that the movement of the second diaphragm capsule will be stopped at a predetermined pressure wthin said predetermined range of outside pressures.

6. An aircraft cabin pressure indicator is claimed in claim 3 wherein the inactivating means for inactivating the response of said second rotatable member to vary the relative rotation of said first and second members comprises an inactive range between said second diaphragm capsule and said second rotatable member so that during a predetermined range of outside pressures the second member will not rotate even though the second diaphragm moves during pressure changes within said predetermined range of pressures and at least one stop rigidly fixed in relationship to the aircraft and positioned with respect to said second diaphragm capsule so that the movement of the second diaphragm capsule will be stopped at a predetermined pressure within said predetermined range of outside pressures.

7. An aircraft cabin pressure indicator for indicating the deviation of cabin pressure from a predetermined schedule of pressures to be maintained within the cabin versus pressure outside the cabin comprising an aircraft cabin an enclosure for enclosing said indicator, a first diaphragm capsule within said enclosure and having interior and exterior sides, the interior side of said first capsule being exposed through said enclosure to the pressure inside said cabin and the exterior side of the first capsule being exposed through said enclosure to the pressure outside said cabin, a completely sealed second diaphragm capsule being within said enclosure and having interior and exterior sides, the exterior side of the second capsule being exposed through said enclosure to said pressure outside the cabin, a dial and a pointer mounted for rotation around a common point said point being fixed in relationship to the cabin, a first rod one end of which is pivotally connected to the movable portion of said first capsule and the other end of which is pivotally connected to said dial at a predetermined distance from the point of rotation of said pointer and the other end of connected to said pointer a predetermined distance from the point of rotation of said pointer and the other end of said second rod positioned in relationship to the movable portion of said second capsule so that said second capsule rotates said pointer only during a predetermined range of outside pressures, at least one stop fixed in relationship to said cabin and positioned in relationship to the movable portion of said second capsule so that from a predetermined outside pressure to zero pressure the second capsule is stopped in its movement, said predetermined outside pressure being a pressure within said predetermined range of outside pressures, said dial having a reference mark, said pointer adapted to overlie said mark and to rotate to either side of said mark to thereby indicate the degree of deviation of the cabin pressure.

References Cited in the file of this patent

UNITED STATES PATENTS

| | | |
|---|---|---|
| 1,175,979 | O'Connor | Mar. 16, 1916 |
| 2,445,183 | Orlob | July 13, 1948 |
| 2,549,673 | Del Mar | Apr. 17, 1951 |
| 2,873,661 | Fischer | Feb. 17, 1959 |